(12) United States Patent
Sun

(10) Patent No.: US 6,473,986 B1
(45) Date of Patent: Nov. 5, 2002

(54) TAPE RULE BLADE

(76) Inventor: Fu-Cheng Sun, No. 126, Pad Chung Road, Hsin Tien City, Taipei Hsien (TW)

( * ) Notice: Subject to any disclaimer, the term of this patent is extended or adjusted under 35 U.S.C. 154(b) by 0 days.

(21) Appl. No.: 09/946,355

(22) Filed: Sep. 6, 2001

(51) Int. Cl.[7] .................................................. G01B 3/10
(52) U.S. Cl. .......................................... 33/757; 33/755
(58) Field of Search ........................ 33/755, 757, 759, 33/771; 242/917

(56) References Cited

U.S. PATENT DOCUMENTS

| | | | |
|---|---|---|---|
| 1,828,401 A | * 10/1931 | Farrand | 33/771 |
| 3,409,988 A | * 11/1968 | Zelnick | 33/771 |
| 4,275,503 A | * 6/1981 | Bergkvist | 33/757 |
| 6,243,964 B1 | * 6/2001 | Murray | 33/755 |
| 6,249,986 B1 | * 6/2001 | Murray | 33/771 |
| 6,324,769 B1 | * 12/2001 | Murray | 33/755 |
| 6,367,161 B1 | * 4/2002 | Murray et al. | 33/755 |

\* cited by examiner

*Primary Examiner*—G. Bradley Bennett
(74) *Attorney, Agent, or Firm*—Rosenberg, Klein & Lee

(57) ABSTRACT

An improved tape rule blade that provides a cross-sectionally concavo-convex tape rule blade having a plurality of gradually varying sections of radii and angles of curvature to effectively increase the total extended length of the tape rule blade and thereby maximize single operator, fully drawn tape rule measurement span. As such, the tape rule blade structure of the present invention enhances tape rule utility and, furthermore, offers additional industrial practical value.

2 Claims, 5 Drawing Sheets

TAPE RULE BLADE

BACKGROUND OF THE INVENTION

1) Field of the Invention

The invention herein relates to an improved tape rule blade in which a cross-sectionally concavo-convex tape rule blade having a plurality of gradually varying sections of radii and angles of curvature effectively increases the total length of extension of the tape rule blade and thereby maximizes single operator, fully drawn tape rule measurement span; as such, the tape rule blade structure of the present invention enhances tape rule utility and, furthermore, offers additional industrial practical value.

2) Description of the Prior Art

In a conventional tape rule, referring to FIG. 1, FIG. 2, and FIG. 3, the blade 11 of the said conventional tape rule 10 is concavo-convex in profile to increase its length of extension, the said length of extension refers to the length L that the concavo-convex blade 11 is pulled up out of the tape rule 10 before the blade 11 bends downward due to its own weight, the length of extension L thus indicating how much downward force the blade 11 is capable of withstanding before flexure; as illustrated, the cross-sectional face of the conventional blade 11 is approximately one inch (25 mm) in width—which is typical for a standard blade 11, with the blade 11 having a curvature of R14 at the center and, furthermore, an elevation angle of 34 degrees at its two sides, which in industrial terms is noted as R14 34 degrees; the length of extension of the said conventional blade 11, as indicated by the L of the drawn out tape rule 10 blade 11 is approximately seven feet, which limits the total extended measurement length by a single operator. In view of the shortcomings awaiting solution of the conventional product, the inventor of the invention herein originated several innovative ideas through extensive research based on specialized knowledge as well as design experience accumulated while engaged in the related fields which culminated in the successful designing of the improved tape rule blade of the invention herein.

SUMMARY OF THE INVENTION

The objective of the invention herein is to provide an improved tape rule blade in which a cross-sectionally concavo-convex tape rule blade having a plurality of sectional variations and, furthermore, the radii of curvature at the rear section of the tape rule blade are smaller than the radii of curvature at the forward section of the tape rule blade, while the angle of elevation along the two sides at the rear section of the tape rule blade are larger than the angle of elevation along the two sides at the forward section of the tape rule blade, thereby increasing the total length of extension of the tape rule blade, maximizing single operator, fully drawn tape rule measurement span and enhancing tape rule utility.

To enable a further understanding by the examination committee of how the said aims are achieved as well as the advantages, other objectives, and functions of the invention herein, the brief description of the drawings below are followed by a detailed description of the preferred embodiment of the present invention.

DETAILED DESCRIPTION OF THE INVENTION

Figure 1:
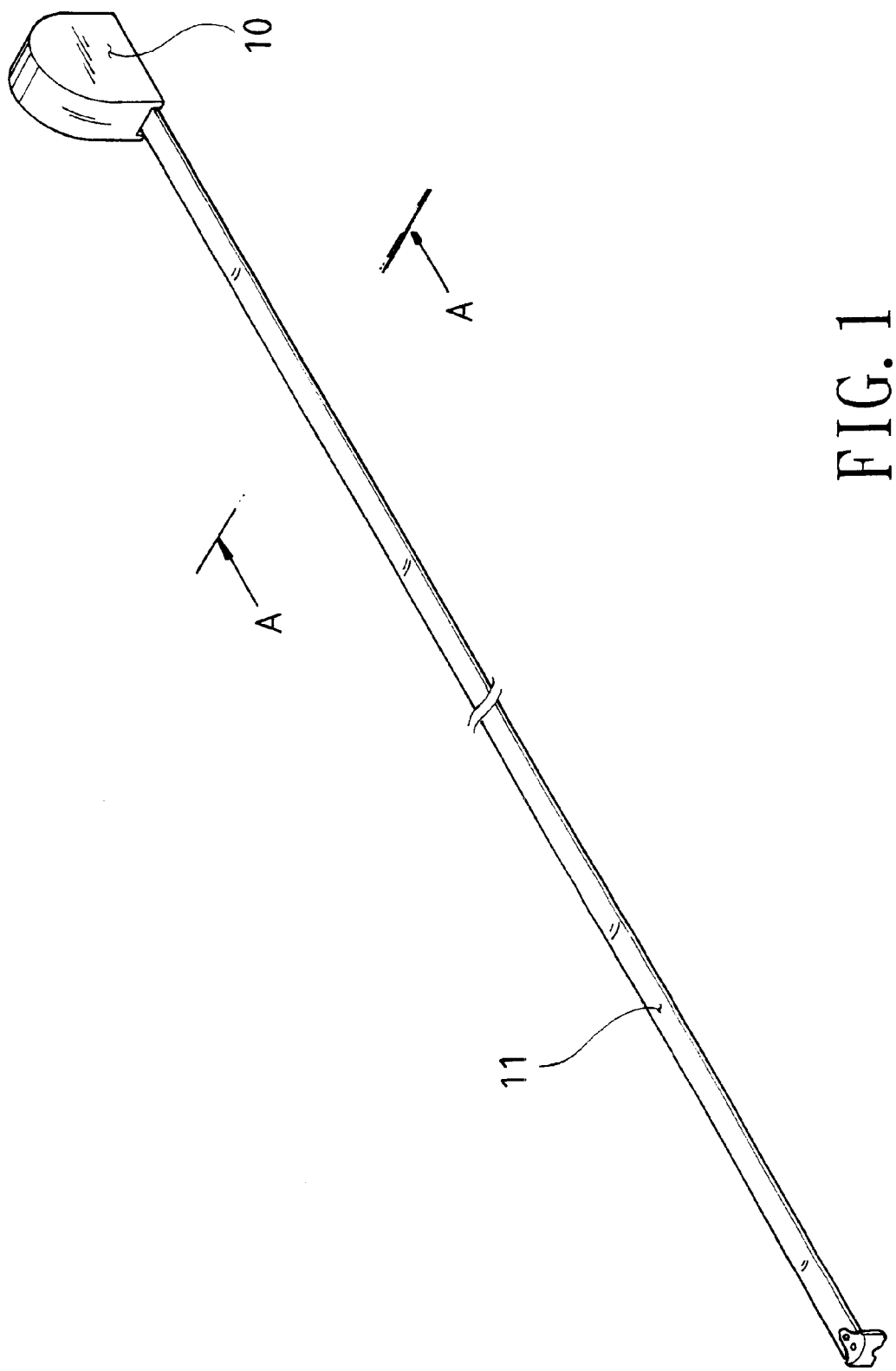
FIG. 1 is an isometric drawing of the conventional product.
Figure 2:
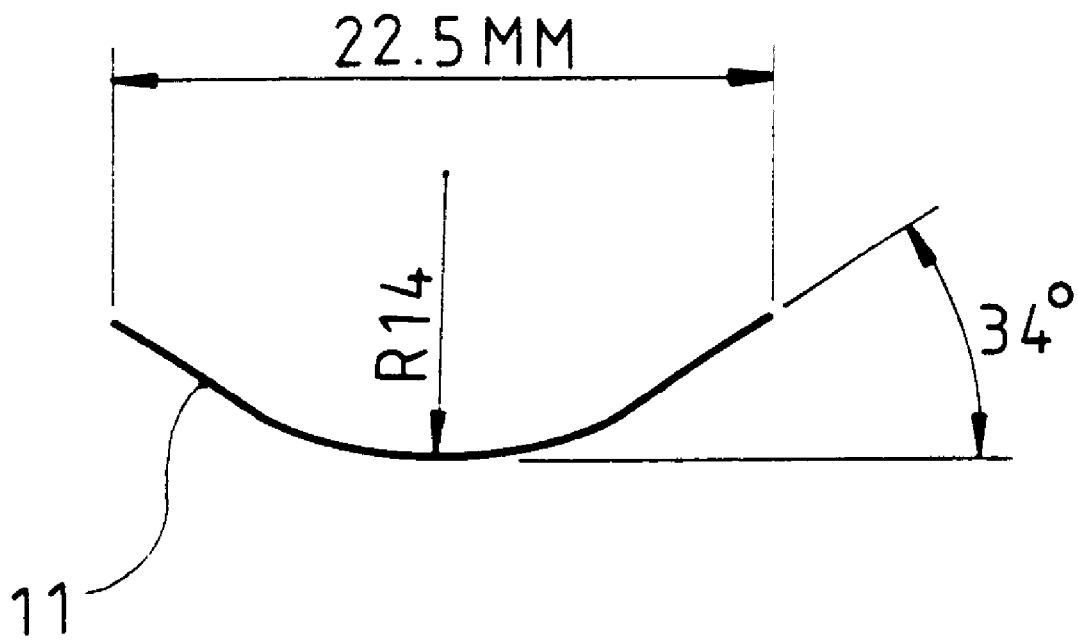
FIG. 2 is a cross-sectional drawing of FIG. 1 as viewed from the perspective of line A—A.
Figure 3:
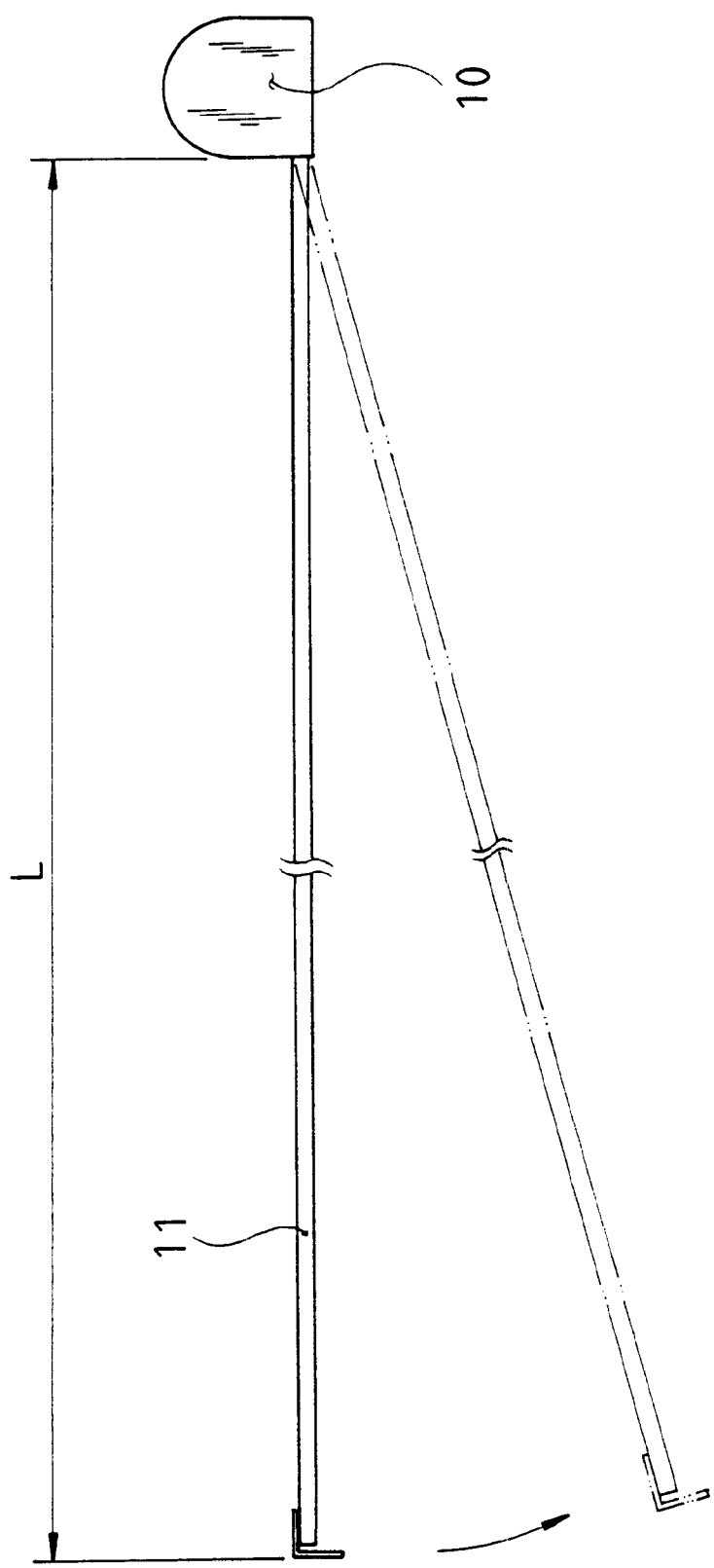
FIG. 3 is an orthographic drawing of the conventional product with the blade 11 pulled out to length L.
Figure 4:
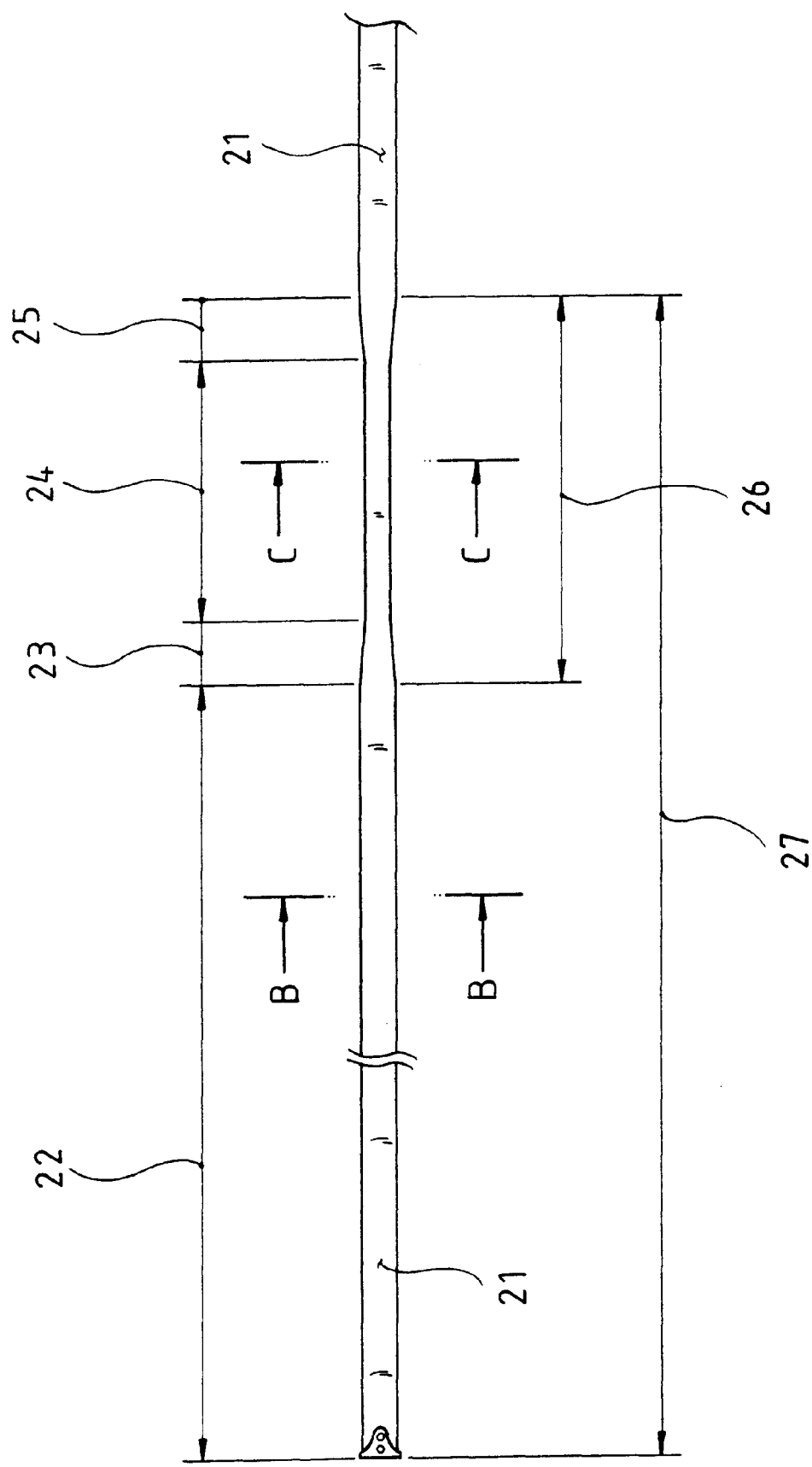
FIG. 4 is an orthographic drawing of the tape rule blade 21 of the invention herein.
Figure 5:
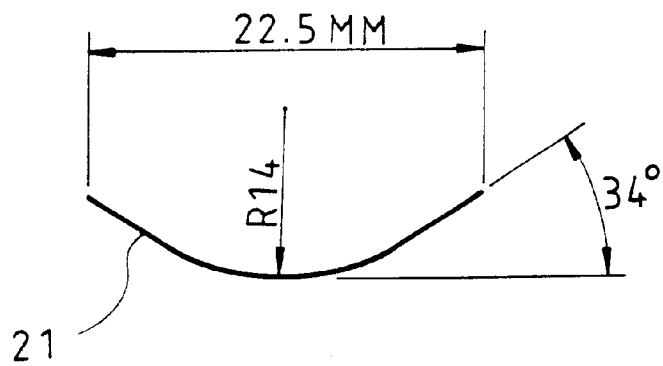
FIG. 5 is a cross-sectional drawing of FIG. 4 as viewed from the perspective of line B—B.
Figure 6:
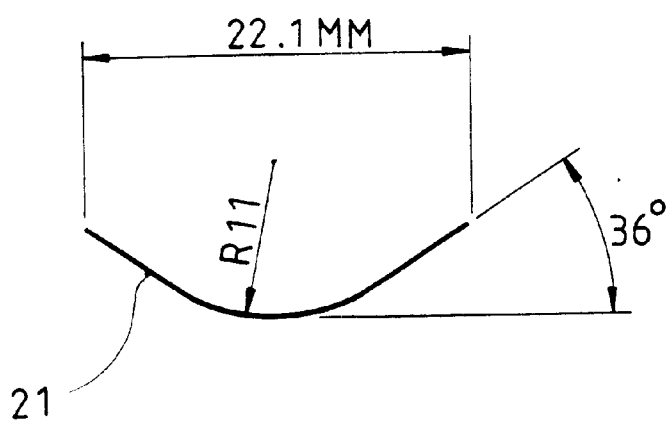
FIG. 6 is a cross-sectional drawing of FIG. 4 as viewed from the perspective of line C—C.

The invention herein provides an improved tape rule blade; referring to FIG. 4, FIG. 5, and FIG. 6, as pulled out to a length of approximately seven feet by its hook, the forward extremity of said tape rule blade 21 consists of a standard radian and angle section 22, the cross-sectionally concavo-convex face of which, as indicated in FIG. 5, is approximately one inch (25 mm) in width, with the radius and the angle of curvature being R14 and 34 degrees, respectively; this is then followed by a contiguous gradually decreasing radian and increasing angle sub-section 23, along which the cross-sectional radii and angles of curvature vary incrementally from R14 and 34 degrees to R13 and 34.5 degrees, R12 and 35 degrees, and eventually R11 and 36 degrees, respectively, that is followed by a contiguous decreased radian and increased angle sub-section 24 having, as indicated in FIG. 6, a cross-sectional radius and angle of curvature of R11 and 36 degrees, respectively, that is next followed by a contiguous gradually increasing radian and decreasing angle sub-section 25, along which the cross-sectional radii and angles of curvature vary incrementally from R11 and 36 degrees to R12 and 35 degrees, R13 and 34.5 degrees, and finally back to R14 and 34 degrees, respectively, the standard radian and angle across the forward extremity of the tape rule blade 21; since the standard radian and angle section 22 at the forward extremity of the tape rule blade 21 of the invention herein is followed contiguously by an gradually advancing transitional section 26 along which the cross-sectional radius and angle of curvature of the tape rule blade 21 changes, an extendible self-standing section 27 is effectively constituted thereafter; the said self-standing section 27 effectively increases the total length of extension of the tape rule blade 21 to 12 feet at minimum, thereby maximizing single operator, fully drawn tape rule measurement span well beyond that of conventional tape rule blades.

The said transitional section 26 of the invention herein consists of a plurality of gradually varying cross sections of radii and angles of curvature contiguously disposed along the tape rule blade 21; the said transitional section 26 can be of an arrangement wherein the radii of curvature at the posterior end are smaller than the radii of curvature at the anterior end, but the angles of curvature at the posterior end are larger than the angles of curvature at the anterior end, with the radii and angles of curvature then dimensioned back to the same as that originally disposed at the forward extremity of the tape rule blade 21 based on this reversed arrangement, thereby improving the measuring blade of the tape rule by effectively increasing its total length of extension.

While the preceding detailed description conveys in general a workable embodiment of the present invention, the said embodiment shall not be construed as a limitation of the scope and claims of the invention herein and, furthermore, all adaptations and modifications based on the technology and spirit of the invention herein shall remain protected within the patented scope of the invention herein.

In summation of the foregoing section, since the invention herein is not only of an original spatial arrangement, but also capable of greater functional utility and possesses utmost practical value and, furthermore, the disclosure of an identical or similar product has not been observed in the prevailing market, the present invention is submitted to the examination committee for review and the granting of the commensurate patent rights.

What is claimed is:

1. An improved tape rule blade, the forward extremity—as pulled out by its hook—of the tape rule blade consists of a standard radian and angle section, followed by a contiguous gradually decreasing radian and increasing angle sub-section, along which the cross-sectional radii and angles of curvature vary incrementally such that radii of curvature change from larger to smaller and the angles of curvature change from smaller to larger that is then followed on the standard radian and angle section by a contiguous decreased radian and increased angle sub-section that is next followed by a contiguous gradually increasing radian and decreasing angle sub-section, along which the cross-sectional radii and angles of curvature vary incrementally such that radii of curvature change from smaller to larger and the angles of curvature change from larger to smaller, resuming the original radius and angle of curvature across the forward extremity of the said tape rule blade; since the said standard radian and angle section at the forward extremity of the said tape rule blade is followed contiguously by a gradually advancing transitional section along which the cross-sectional radius and angle of curvature of the said tape rule blade changes, an extendible self-standing section is effectively constituted thereafter, which improves the blade of the tape rule by effectively increasing its total length of extension.

2. As mentioned in claim 1 of the improved tape rule blade of the invention herein, consisting of a plurality of gradually varying cross sections of radii and angles of curvature along the said tape rule blade, the said transitional section can be of an arrangement wherein the radii of curvature at the posterior end are smaller than the radii of curvature at the anterior end, but the angles of curvature at the posterior end are larger than the angles of curvature at the anterior end, with the radii and angles of curvature then similarly dimensioned back to the same as that at the forward extremity of the said tape rule blade based on this reversed arrangement, thereby also improving the blade of the tape rule by effectively increasing its total length of extension.

* * * * *